United States Patent [19]
Bannister

[11] Patent Number: 4,607,150
[45] Date of Patent: Aug. 19, 1986

[54] LASER SPOT WELDER

[75] Inventor: Robert D. Bannister, Loveland, Ohio

[73] Assignee: Cincinnati Milacron Inc., Cincinnati, Ohio

[21] Appl. No.: 606,791

[22] Filed: May 3, 1984

[51] Int. Cl.⁴ ............................................. B23K 26/00
[52] U.S. Cl. ...................... 219/121 LC; 219/121 LU; 219/121 LV; 901/42
[58] Field of Search .................. 219/121 LC, 121 LD, 219/121 LP, 121 LQ, 121 LR, 121 LU, 121 LV, 121 LN, 121 LG; 901/47, 41, 42, 45

[56] References Cited

U.S. PATENT DOCUMENTS

Re. 31,042  9/1982  Clark et al. .............. 219/121 L UX
4,237,363  12/1980  Lemelson ............................ 219/121

FOREIGN PATENT DOCUMENTS 0105886   8/1981  Japan ............................ 219/121 LD
0181789  11/1982  Japan ............................ 219/121 LC
2134071   8/1984  United Kingdom ......... 219/121 LU Primary Examiner—M. H. Paschall
Attorney, Agent, or Firm—Thomas M. Farrell

[57] ABSTRACT

An industrial robot carries a portable laser welder on its movable end effector. The welder has a hollow compression tube axially movable against an anvil to hold a plurality of workpieces together while welding. The laser beam is brought through the tube from a remote laser generator by means of an articulatable light pipe system connecting the compression tube and the generator.

10 Claims, 11 Drawing Figures

LASER SPOT WELDER

BACKGROUND OF THE INVENTION

The present invention relates to a laser spot welder for use with a manipulator mechanism such as an industrial robot.

It is generally known that conventional electric spot welders are used in conjunction with industrial robots for processing work on automotive assembly lines. Such spot welders are generally connected to the manipulatable end effector of the robot and are movable to perform a variety of welding tasks.

Conventional electric spot welders are constructed as follows: A pair of opposing copper tips are movable between open and closed positions with respect to one another so that they may tightly clamp a workpiece between the tips. The welding guns as they are referred to, have an electrode force clamping package in the neighborhood from 600 to 1500 lbs. to be exerted against the workpiece. High amperage current is then passed through the electrode pair causing resistance welding to occur at the build up of heat at the interface of two layers of weldable material. The electrode and clamping mechanism is fitted with a cooling water line to remove the heat from the welding tool.

Many disadvantages are associated with conventional electric resistance spot welding guns. For example: the high mechanical clamping forces causes deformation of the relatively soft copper electrode over a period of time; similarly, an indentation is caused on the sides of the workpiece during welding; the high temperature of the electrode tips causes a gradual burning and degradation of the electrode tip; the electrode tips must be periodically redressed to present a shiny and properly shaped end to the workpiece; and, the electrodes must periodically be replaced.

When conventional electric resistance spot welding guns are employed at stationary work stations, the power supply and related connections do not present a problem. However, when used in conjunction with the movable end of a robot, the difficulty of moving the end package and its associated connections becomes of paramount importance. The conventional spot welding gun requires a transformer to be carried with the robot and heavy copper wires to be connected from the transformer to the welding gun. These wires as well as the water cooling hoses cause additional weight to be borne by the industrial robot. Additionally, the wiring package is usually not very flexible, and thus the robot will be faced with mechanical drag and resistance when performing its programmed moves.

It has been proposed to employ lasers in conjunction with industrial robots to perform a variety of tasks previously done with conventional tools. For example, industrial robots have utilized a laser beam to cut and trim workpieces. Such laser beams may typically emanate from a $CO_2$ light source, and a problem encountered is that the laser generating unit such as a 1.5 KW "power laser" to perform work on industrial workpieces may weigh in the order of 350 to 550 lbs. Therefore, it has been proposed that the light source be located somewhat remote from the robot unit and the light beam be directed through an articulatable conduit having a flexible arm structure with totally reflecting mirror positioned in its articulation joints, such as might be used in laser surgery. At the end of the system, the laser beam is focused to a small spot by a focusing lens provided in the end of the light conducting mechanism. The focusing lens unit is typically connected in some fashion to the end effector of a robot, so that the robot may perform its programmed moves and need only be concerned with carrying the output end of the laser conducting mechanism.

It has been proposed that a laser beam source be used for welding operations. In consideration of a spot welding operation, two layers of a weldable material must be intimately placed in contact with one another and a laser beam directed at at least one surface of the layered assembly. Sufficient heat is generated by a power laser to cause an interface melting of the two materials and a consequent weld formation between the two. It would seemingly be a relatively simple task to therefore perform spot welding operations utilizing a laser beam in industrial applications by simply focusing the beam at a desired number of spots on material to be welded. However, in practical application, the task of performing production spot welding intervals is a difficult one for the reason that the workpieces generally are not totally flat and therefore, are not in intimate contact with one another. Mechanical misalignments of components to be welded, and slight deformations and tolerance variations may cause the weldable materials to be slightly spaced apart at the weld site.

Applicant has obviated the difficulties inherent in the prior art devices by a novel laser spot welding unit which is suitable for portable manipulation by an industrial robot. Further, the novel device will permit the weldable workpieces to be placed in intimate contact with one another with relative ease and without obstructing the path of the laser beam.

It is therefore an object of the present invention to provide a laser spot welder which may be easily employed on the end effector of an industrial robot.

Another object of the present invention is to provide a laser spot welder with integral part holding means for maintaining weldable workpieces in intimate contact with one another.

Another object of the present invention is to provide a laser spot welder for use with an industrial robot wherein workpiece holding means is employed which will permit an unobstructed path for the laser welding beam.

SUMMARY OF THE INVENTION

The invention is shown embodied in a laser spot welder for use in conjunction with an industrial robot, having a base frame mountable to the end effector of a robot wrist, wherein an anvil is relatively fixed to the base frame and a movable anvil compression member is mounted to the base frame. In the preferred embodiment, a fluid cylinder is provided as a means for moving the anvil compression member. In one alternative embodiment, the fluid cylinder is mounted in parallel to the linearly movable compression member while in the preferred embodiment the piston of the fluid cylinder is coaxial with the compression member. The compression member is attached to a laser beam conductor carried by the frame and aligned for focusing a laser beam at a welding target near the anvil. The laser beam conductor in the preferred embodiment comprises a hollow bore through the piston rod and anvil compression member so as to form a coaxial tubular assembly for clamping a layered pair of workpieces. A laser aperture is mounted to the base frame and is aligned with the inlet of the laser beam conductor bore and a laser beam source is mounted proximal the base frame and aligned for directing a laser beam into the laser aperture. Thus, the unobstructed path of the laser beam conductor bore will permit the laser beam to continue toward the anvil and be focused by a focusing means carried within the laser beam conductor bore to thereby weld two workpieces intimately held in contact with one another by the advanceable coaxial assembly of: the anvil compression member; laser beam conductor bore; and piston for moving the anvil compression member.

DESCRIPTION OF THE PREFERRED EMBODIMENT

Figure 1:
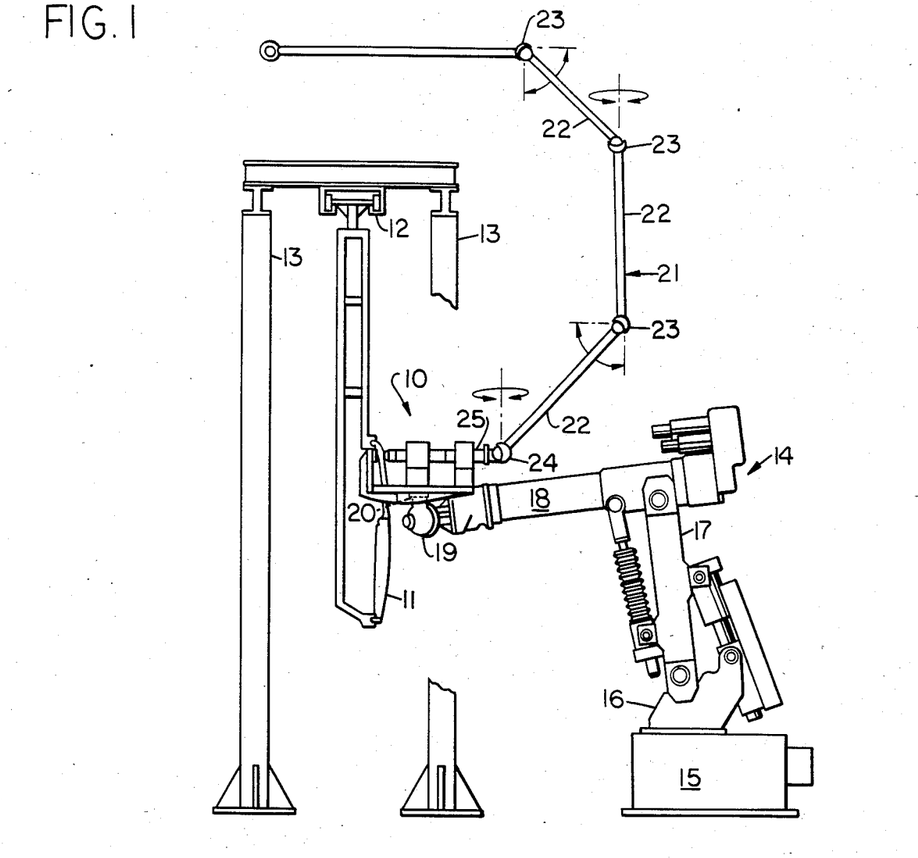
FIG. 1 is a side elevational view of an industrial robot performing a laser spot welding operation on a trolley carried workpiece.

Referring to FIG. 1 of the drawings, there is shown an environmental view of a laser spot welder 10 for performing work on a typical workpiece, such as the automobile door panel 11 depicted, comprised of layered weldable material. The door panel 11 is carried on an overhead trolley 12 supported by floor stands 13, and the laser spot welder 10 is manipulatable around the workpiece area by an industrial robot 14. The industrial robot 14 pictured is an articulatable jointed arm robot such as that depicted in U.S. Design Pat. No. 269,681, wherein a base 15 is carried on the floor and a shoulder joint 16 is rotatable on the base 15. An upper arm 17 and forearm 18 are movable with respect to the shoulder joint 16. The wrist 19 carried on the forearm is substantially of the same assembly shown in U.S. Pat. No. 4,068,536. The wrist 19 has three rolls of movement, and the end effector 20 is affixable to robot tooling. The laser spot welder 10 is mounted to the end effector 20 of the wrist 19. Here it should be noted that other types of manipulators and robots may be employed to carry the laser spot welder 10, and similarly other types of wrists may be employed which may be limited in roll or or bend movements without departing from the spirit of this invention. A laser beam source (now shown) provides a laser beam which is ducted through a light conducting mechanism 21 having a flexible arm structure comprised of light pipes 22 serially joined at articulation joints 23. The articulation joints 23 have totally reflecting mirrors positioned therein for properly directing the light beam axially along the light pipes 22. The final articulation 24 in the jointed assembly is attached to the laser spot welder 10 at a laser beam aperture 25 for admitting the light beam.

Figure 2:
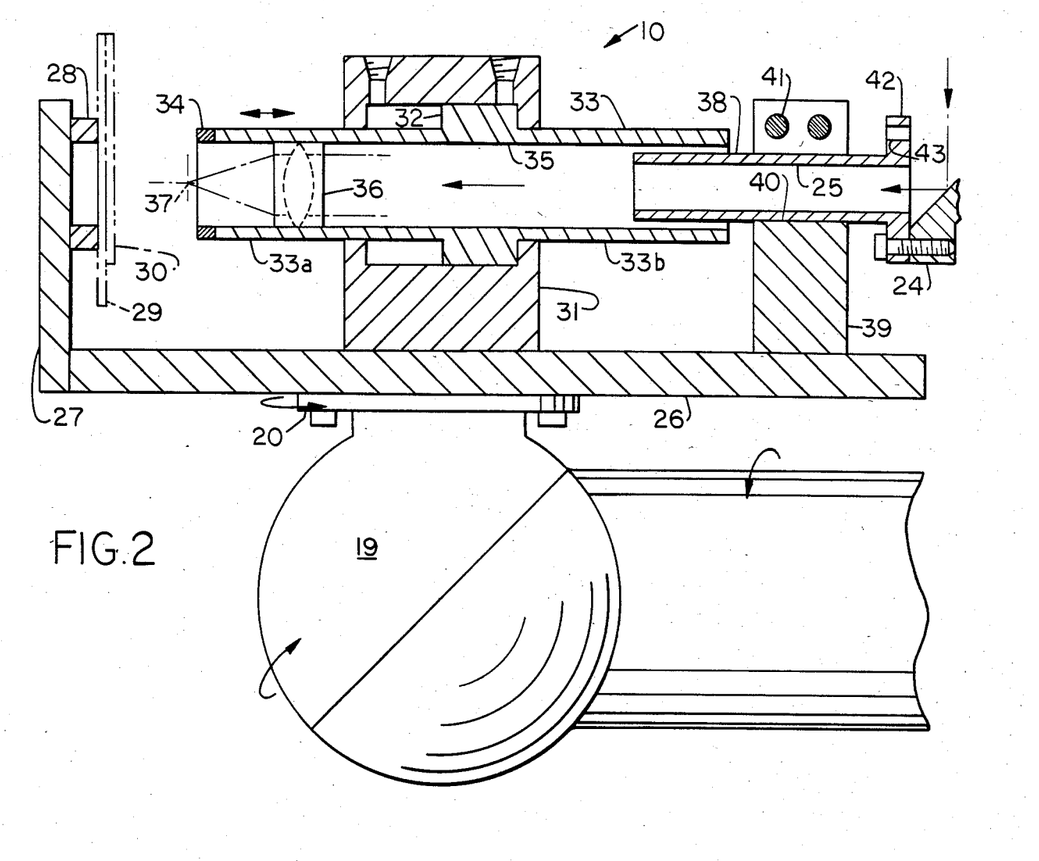
FIGS. 2 and 2A are a schematic representation of the laser spot welder of FIG. 1 simplified of construction details.

Reference to FIG. 2 shows a schematic representation of the laser spot welder 10 of FIG. 1, wherein basic elements of the assembly are depicted. The base frame 26 consists of a generally plate-like member attached to the movable end effector 20 of the robot wrist 19, and one end of the frame is provided with an upright plate 27. The plate 27 has an anvil 28 attached thereto which, in the preferred embodiment, comprises a ring for providing an annular clamp area to a pair of weldable workpieces 29,30. Midspan the structure, the spot welder 10 is provided with a fluid cylinder 31 having its axis aligned with the axis of the anvil 28, i.e. parallel to the base frame plate 26. The fluid cylinder 31 is fitted with a movable piston 32 and a piston rod 33 extends from both ends of the piston 32. The forward end 33(a) of the piston rod 33 has an anvil compression member 34 which basically consists of an annular ring area matched to the anvil for clamping the pair of weldable workpieces 29,30. The double-ended piston rod 33 therefore serves as a linear way system to guide the anvil compression member 34. The piston rod 33 has a laser-conducting bore 35 machined coaxially with the rod 33.

Figure 4:
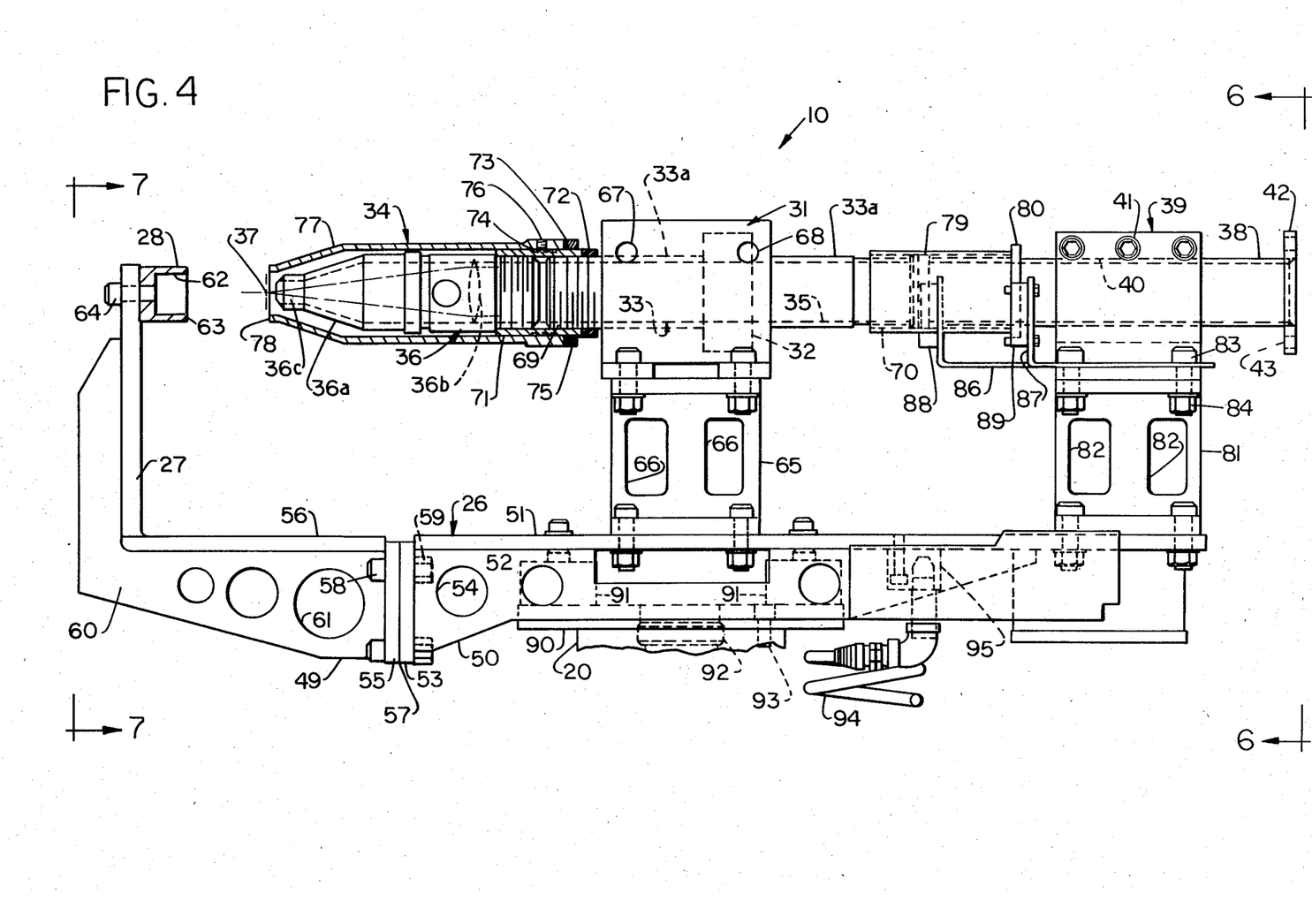
FIG. 4 is a side elevational view of the laser spot welder of FIG. 1 showing construction details.

The forward end 33(a) of the rod 33 is also fitted with a laser focusing mechanism 36, which may be comprised of a variety of focusing lenses and the like adapted to be located within the rod 33 as shown in FIG. 4. The purpose of the focusing mechanism 36 is to concentrate and focus the laser beam to a target spot 37 proximal the anvil compression member 34 so that when the anvil 28 and anvil compression member 34 are clamped against the workpieces 29,30 the focus spot 37 will cause localized heating and welding of the workpieces 29,30. Here it should be noted that the focusing mechanism is not considered an obstruction, even though it may be of solid construction. The lens system employed in the unit is substantially invisible to the laser beam. The incoming, unfocused beam of a power laser may be approximately ⅜" in diameter. The focus mechanism 36 increases the density of beam energy, in watts per square inch. By mounting the focusing lens 36(b) in close proximity to the end of the compression member 34, the beam will not tend to diverge as much as a beam focused at a point more remotely located from the weld zone (for example, at or near the aperture 25), thus tending to insure the concentration of energy at the work site.

The opposite end 33(b) of the piston rod 33 is open and unobstructed, and a laser aperture tube 38 is telescopically fitted within the piston rod 33. The tube 38 is clamped to an upright clamp block 39 which is affixed to the base frame plate, 26 and aligned so that its bore 40 is coaxial with the bore 35 of the piston rod 33. The laser aperture tube 38 is adjustably mounted and clamped by a plurality of clamp screws 41 in the upright block 39. The aperture tube 38 has a flange 42 at its outermost end and bolt holes 43 are provided therethrough for affixing the final articulation 24 of a laser beam light conducting mechanism 21. The beam is reflected from a mirror in the articulation 24 through an inlet or laser aperture 25 and ducted through the piston rod 33 and focus mechanism 36 for joining workpieces 29,30 to be welded.

It has been determined that slight bends and misalignments of the workpieces 29,30 to be joined may be overcome by a very slight clamping force, i.e. in the nature of several pounds. Since the clamping force is not necessary to effect the weld, as in conventional electric resistance spot welder guns, tonnage is not required to place the workpieces 29,30 in intimate contact with one another. Also, in the preferred embodiment, the annular anvil ring concept is employed for introducing clamping pressure on an annular area so that deformation of the workpiece external surfaces will not occur in the softened weld zone. However, it may be appreciated that the anvil 28 and cooperating anvil structure may be any of several possible configurations including that having a solid anvil surface.

Figure 3:
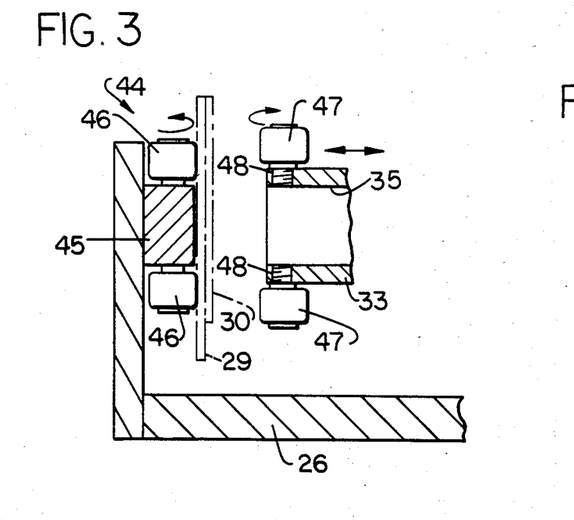
FIGS. 3 and 3A are an alternate embodiment of the anvil portion of the laser spot welder of FIG. 2.

While the apparatus has been described so far in connection with a fixed workpiece and spot welding operation, it may be appreciated that in certain instances, the workpieces may, in some instances, necessarily be moved for adjustment purposes or for extending the length of a weld. In such instances, the clamp force and friction coefficient of the anvil 28 and anvil compression member 34 becomes a consideration. An alternate embodiment of the invention is shown schematically in FIG. 3, wherein an antifriction roller mechanism 44 is used to hold the workpieces 29,30 together. The anvil unit is thus comprised of a fixed block 45, having a pair of oppositely-extending antifriction rollers 46, such as cam followers, which are rotatable with respect to the fixed block 46 around axes transverse to the base plate 26. A matching pair of rollers 47 are mounted to the piston rod 33 by the threaded studs 48 shown. In such fashion, the laser conductor bore 35 remains unobstructed, so the laser beam may reach the target. The roller circumference extends to a point beyond the end of the piston rod 33, so no rubbing will take place as the workpiece 29,30 are moved bidirectionally (in the plane of the paper, as viewed by the reader). The clamping force is impressed by the piston 32, so the oppositely reacting rollers will cause the workpiece surfaces to lay on one another intimately for a spot welding operation or for a continuous welding operation.

Figure 2A:
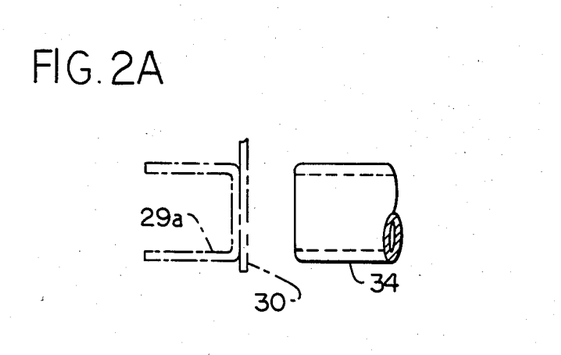
Figure 3A:
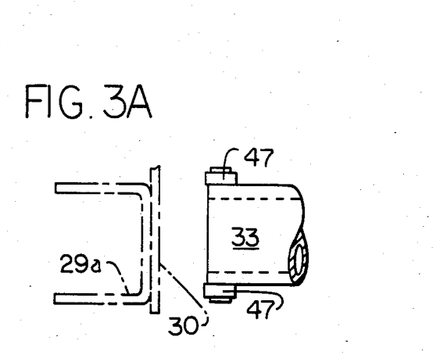

In many cases, the workpiece 29 may function as its own "anvil", due to being formed into a stiff configuration, for example, a box or channel section. In such cases, the plate 27 and anvil 28 may be omitted and the workpiece 29(a) will alone provide a sufficient reaction force for the compression member 34, as shown in FIG. 2(a). Similarly, the assembly shown in FIG. 3 may be modified to the structure in FIG. 3(a) where the workpiece 29(a) is of sufficient stiffness.

The actual structure of the laser spot welder 10 is depicted in FIG. 4, wherein the base frame 26 is comprised of front and rear fabricated members 49,50 bolted together. The rear member 50 comprises, in part, a horizontal plate 51 having vertical stiffener gussets 52 welded thereto and to a forward, downwardly-extending vertical end plate 53. The gussets have lightening holes 54 machined throughout to reduce the weight of the structure. The front member 49 has a matching vertical end plate 55 and a main horizontal plate 56. The interface 57 of the vertical plates 53,55 is fitted with screws 58 and nuts 59 to form a secure assembly. The outermost end of the front member horizontal plate 56 has an upwardly-extending vertical plate 27 welded thereto for supporting an anvil 28. A stiffener gusset 60 is welded to the horizontal and vertical plates 27,56 and has a series of lightening holes 61 therein. The anvil 28 is a cylindrical piece having its axis horizontally disposed and having a counterbore 62 in its front face so as to provide an annular compression area 63. The rear face of the anvil 28 is mounted to the vertical plate 27 by screws 64. Midspan the structure, a cylinder support bracket 65 is bolted to the rear member 50 of the base frame 26. The bracket 65 is comprised of a weldment having burned out portions 66 to lighten the structure. The top surface of the bracket 65 is fitted with a fluid cylinder 31 having front and rear fluid ports 67,68 for moving a companion piston 32 bidirectionally and parallel to the base frame plate 51. The piston 32 has front and rear extending portions 33(a)(b), of a piston rod 33 and a bore 35 is provided throughout the piston rod length. The bore 35 serves as a laser beam conductor. The outboard extremities 69,70 of the piston rod 33 are provided with external threads. The forward end 69 of the piston rod 33 has a collar 71 threadably received thereon with a locknut 72 for axially positioning the collar 71. The collar 71 is threaded throughout its length and the laser focus mechanism 36 is threadably received therewith to form a coupling with the piston rod 33. The laser beam focus mechanism 36 basically consists of a hollow housing 36(a) supporting an internally-mounted lens 36(b) for converging the beam. The lens 36(b) may be comprised of a plurality of stacked cooperating lenses. The converging beam exits the end of the housing 36(a) through an orifice 36(c).

The rear portion 73 of the exterior of the collar 71 is threaded and the central exterior portion of the collar has a circular groove 74. A tubular anvil compression member 34 is slidably received on the forward end of the collar 71 and is positioned against a lock nut 75 threadably received on the collar 71. When the axial position of the tubular member 34 is correct, the member 34 is held with the collar 71 by a set screw 76 extending through the member 34 and into the circular groove 74. The compression member 34 is cylindrical throughout the majority of its length and of substantially constant wall thickness, extending to a converging tapered end portion 77 which terminates at an annular facial ring. The annular ring 78 is matched to the anvil 28 for holding a pair of workpieces together. As shown in the drawing, the convergent point 37 of the laser beam is focused just outside the face of the anvil compression member 34, to cause localized heating at the interface of a pair of workpieces. The convergent point 37 is adjustable for workpiece thicknesses. The rearwardly extending piston rod portion 33(b) has a tubular member 79 threadably received therewith, and extending rearwardly to an exterior flange portion 80. The majority of the length of the tubular member 79 is smoothly machined.

Figure 5:
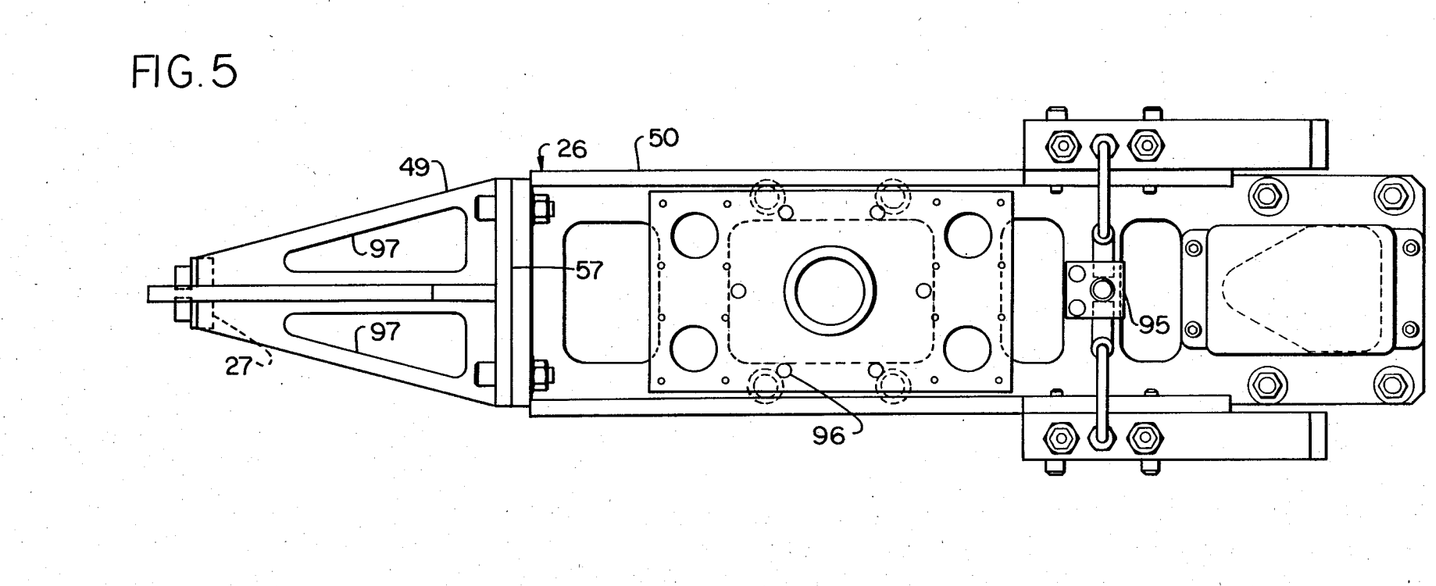
FIG. 5 is a bottom plan view of the laser spot welder of FIG. 4 taken in the direction of arrow 5 of FIG. 4.

The rearmost portion of the base frame plate 51 has a rear support bracket 81 bolted therewith, and the rear support bracket comprises a fabrication similar to the cylinder support bracket 65, i.e., a weldment created by plates and gussets, and burned out portions 82 are provided to relieve the weight. The top surface of the rear bracket 81 supports a clamp block 39 affixed by screws 83 and nuts 84, and a bore 40 is provided through the clamp block 39 coaxial with the piston rod 33. The top section of the clamp block 39 has a saw slot 85 cut through to the bore 40 (see FIG. 6), and transverse clamp screws 41 are provided so that the block 39 may clamp securely on a laser aperture tube 38 slidably received therein. The laser aperture tube 38 is of tubular construction and is adjustable in an axial direction so as to be telescopically received with the tubular member 79 of the piston rod 33 to provide an enclosure for the laser beam. The clamp block mounting screws 83 also pass through a pair of switch mounting angle brackets 86,87, received alongside the clamp block 39. The switch mounting angle brackets 86,87 support a pair of proximity switches 88,89 at fore and aft positions which indicate the piston rod end-of-stroke positions by sensing the flange portion 80 of the tubular member 79. The outboard end of the laser aperture tube 38 has an external flange 42 welded therewith, and the flange 42 is provided with a plurality of bolt holes 43 for affixing the mirrored articulation of a laser light pipe system 21 (see FIG. 1). Beneath the base frame plate 51, midspan the structure, the end effector 20 of the articulatable wrist 19 of FIG. 1 is shown mounted to a mounting plate 90 spaced apart from the plate 51 by blocks 91. A locating plug 92 is provided in the end effector 20 and in the base frame mounting plate 90, and a plurality screws 93 are arranged in a bolt pattern around the locating plug 92. A plurality of coiled fluid supply hoses 94 are connected to a junction block 95 at the rear, underneath the base frame plate 51. The junction block 95 is interdrilled and provided with hoses (not shown) extending to the fluid ports 67,68 of the fluid cylinder 31 to provide motive power for the piston 32. The bottom plan view of FIG. 5 more clearly shows the compact hose and junction block 95 and the end effector mounting screw holes 96. The rear member 50 of the base frame 26 is of generally fixed width, while the front member 49 is tapered from the vertical interface 57 to the upright vertical end plate 27. Triangular burned out portions 97 are provided through the front member 49 to lighten the structure.

Figure 6:
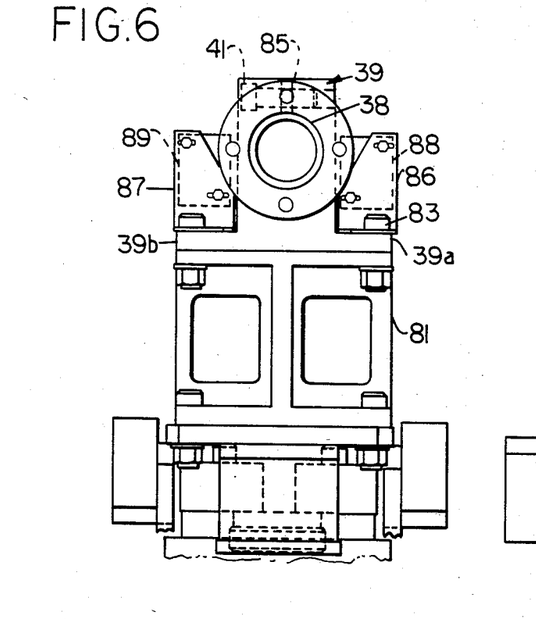
FIG. 6 is a right end elevational view of the laser spot welder of FIG. 4 taken in the direction of arrow 6 of FIG. 4.

The right side elevation shown in FIG. 6 depicts that the laser aperture tube 38 is received in the clamp block 39 which is of generally solid construction having a saw slot 85 at its topmost portion with transverse screws 41 for clamping the tube 38 in a well-known manner. The bottom portion of the clamp block 39 has side-extending ears 39(a)(b) for receiving mounting screws 83 through the rear support bracket 81. The proximity switches 88,89 are shown mounted on the respective switch angle brackets 86,87.

Figure 7:
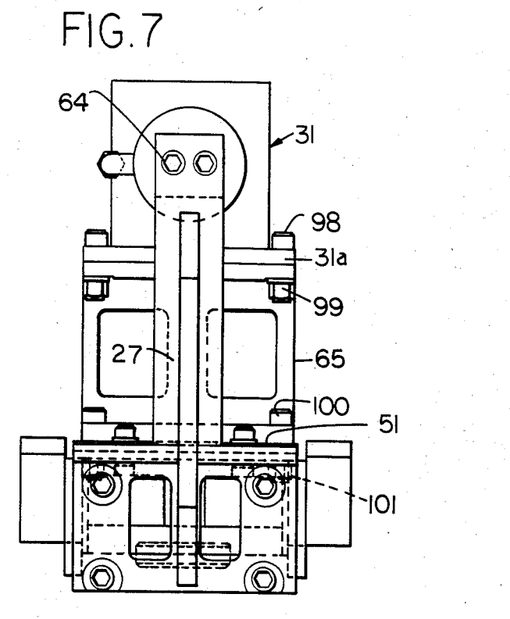
FIG. 7 is a left end elevational view of the laser spot welder of FIG. 4 taken in the direction of arrow 7 of FIG. 4.

FIG. 7 depicts the left side elevational view showing that the fluid cylinder 31 is provided with a base 31(a) for receiving mounting screws 98 and nuts 99 which secure the cylinder 31 to the cylinder support bracket 65. The cylinder support bracket 65 is in turn secured by screws 100 passing through it and the base frame plate 51 and held by nuts 101. The vertical plate 27 at the end of the assembly has a pair of screws 64 passing through, to secure to anvil 28 (see FIG. 4).

ALTERNATE EMBODIMENTS

Figure 8:
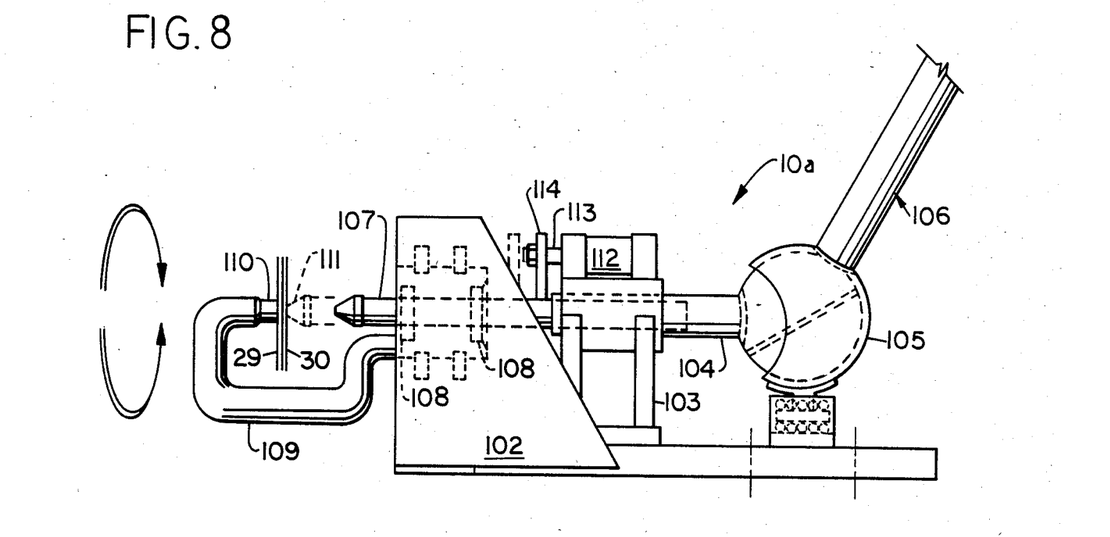
FIG. 8 is an alternate embodiment of the laser spot welder of FIG. 1.

The view shown in FIG. 8 depicts an alternate embodiment of the laser spot welder 10(a), wherein the base frame 102 carries a laser aperture support block 103, and the laser aperture tube 104 extends rearwardly from the support block 103 to an articulation 105 formed at the end of a light pipe system 106. The laser aperture tube 104 has an anvil compression tube 107 telescopically mounted therein and slidable through bearings 108 carried in the base frame 102. The base frame 102 carries an anvil support bracket 109 which mounts an anvil 110 similar in manner to that shown and described in FIG. 2. The anvil 110 is positioned against one side of a pair of workpieces 29,30 to be welded together, and an anvil compression member 111 received on the anvil compression tube 107 is directed against the workpieces 29,30 when a laser welding operation is to be performed. A fluid cylinder 112 is mounted to the top of the laser aperture support block 103 and has a single piston rod 113 extending from its forward end, parallel to the anvil compression tube 107. The piston rod 113 is coupled to the anvil compression tube 107 by a yoke 114 received on the threaded end of the piston rod 113 and welded to the compression tube 107. In such manner, therefore, the self-contained commercial cylinder 112 is used to provide bidirectional movement to the axial compression tube 107, and changeover of cylinders is easily accomplished. Further, it will be appreciated that since the load to be applied to the workpieces is in the nature of several pounds, no appreciable distortions or overturning moments will be realized by the bearings due to the offset cylinder mounting.

Figure 9:
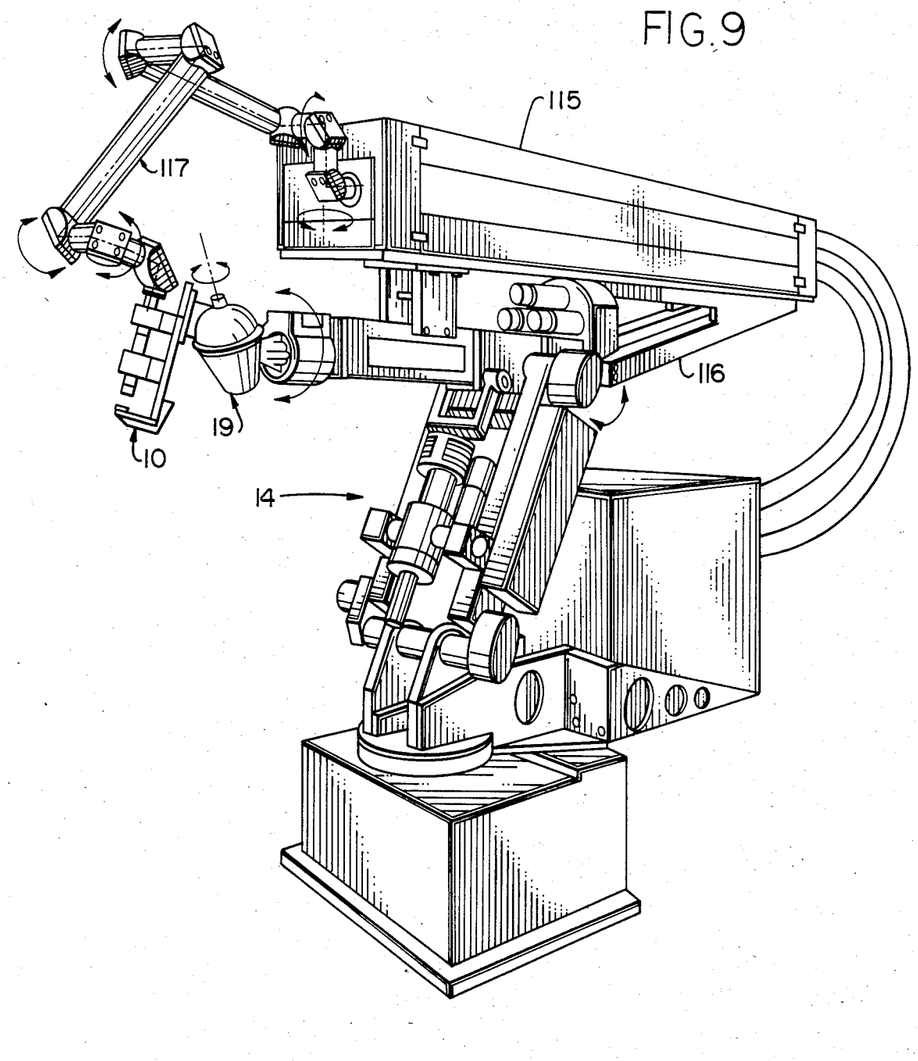
FIG. 9 is an alternate embodiment of the laser spot welder of FIG. 1, having a robot carried laser generator source.

Another alternate embodiment is shown in FIG. 9, wherein an industrial robot 14 and wrist 19 combination as described in connection with FIG. 1, are used to support and move the laser spot welder 10 of FIG. 1. However, in the assembly shown, a laser generator 115 is mounted to the robot forearm 18 by a special mounting bracket 116, and an articulatable light pipe system 117 is provided to direct the beam from the front end of the laser generator 115 to the aperture tube 38 of the laser spot welder 10.

While the laser spot welder unit described in connection with FIGS. 1 and 2 has been shown in conjunction with an industrial robot, it may also be appreciated by those skilled in the art, that the spot welder unit could be mounted to a dedicated manipulator, i.e., not having the programmable aspects of an industrial robot. Further, the laser spot welder could be mounted to a coordinate slide machine for performing repetitive welding operations in the same or parallel planes. It may also be appreciated that continuous welding may be effected through the embodiment shown and described in connection with FIG. 3.

While the invention herein has been shown in connection with a preferred embodiment and selected alternate embodiments thereof, it is not intended that the invention be limited to the embodiments shown, but rather the invention extends to all such designs and modifications as come within the spirit and scope of the appended claims.

What is claimed is:

1. In combination with an industrial robot, having a wrist end effector movable through multivector spatial orientations, an improved material treating apparatus, wherein the improvement comprises:
    (a) a base frame;
    (b) means for mounting said frame to said movable end effector;
    (c) a piston, linearly movable in a cylinder affixed to said base frame;
    (d) a hollow piston rod member affixed to said piston, having a laser beam conductor bore aligned for focusing a laser beam at a target;
    (e) a compression member carried by said piston rod member, to positions proximal and distal to said target;
    (f) a laser aperture coaxially aligned with said laser beam conductor bore; and (g) laser beam source means for directing a laser beam into said laser aperture, through said conductor bore, to said target.

2. The aperture of claim 1, wherein said compression member comprises one end of said hollow piston rod member.

3. The apparatus of claim 2, wherein said laser aperture comprises a tubular member relatively fixed to said base and telescopically fitted with the opposite end of said hollow piston rod member.

4. The aperture of claim 3, wherein a laser focus lens is carried in unison with said hollow piston rod member as said member moves relative to said base frame.

5. The apparatus of claim 3, wherein a laser focus lens is relatively fixed with respect to said base frame and aligned coaxially with said hollow piston rod member.

6. A laser welding system, comprising in combination:
   (a) an industrial robot having a wrist and wrist end effector movable through multi-vector spatial orientations;
   (b) a workpiece support base located proximate to said robot;
   (c) a laser welder, comprising:
      (1) a base frame;
      (2) an anvil relatively fixed to said base frame;
      (3) an anvil compression member movably mounted on said base frame;
      (4) means for moving said anvil compression member linearly with respect to said anvil;
      (5) a laser beam conductor carried by said frame, linearly movable with said compression member and aligned for focusing a laser beam at a welding target proximal to said anvil,
      (6) a laser aperture aligned with said laser beam conductor, and
      (7) laser beam source means for directing a laser beam into said laser aperture, and
   (d) means for mounting said laser welder to said robot wrist end effector wherein said laser welder is orientable by said robot with respect to said workpiece support base to effect welding operations on a workpiece.

7. In combination with an industrial robot having a wrist end effector movable through multi-vector spatial orientations, an improved laser spotwelder, comprising:
   (a) a base frame generally comprising an elongate plate and an upright extension at one end and including means for mounting said frame to said end effector;
   (b) an anvil affixed to said upright extension;
   (c) an anvil compression member comprising an end portion of a movable linearly extensible piston rod;
   (d) a piston, coaxially affixed to said piston rod and closely fitted to a relatively fixed fluid cylinder mounted to said base frame plate, so as to advance and retract said anvil compression member relative to said anvil;
   (e) a coaxial laser conductor bore through said piston rod and aligned to focus a laser beam at a welding target proximal to said anvil;
   (f) a laser aperture through an aperture member affixed to said base frame plate, said aperture member and said piston rod telescopically fitted to one another; and
   (g) laser beam source means for directing a laser beam into said laser aperture, through said conductor bore, to said target.

8. The laser spotwelder of claim 7, wherein said anvil comprises a ring-like member and said anvil compression member comprises a ring-like end of said piston rod.

9. The laser spotwelder of claim 7, wherein said anvil comprises, in part, at least one roller having its rotary axis transverse to the linear axis of said piston rod, and further wherein said anvil compression member comprises, in part, at least one roller carried on said piston rod end portion, said rollers oppositely disposed to one another and carried on parallel rotary axes.

10. The laser spotwelder of claim 7, wherein said laser beam source means includes a jointed light pipe conductor system connecting a remote laser beam generator to said laser aperture.

* * * * *